March 17, 1964
J. D. ALLEN ETAL
3,125,110
DEMAND TYPE FLOW DIVIDER
Filed July 10, 1961
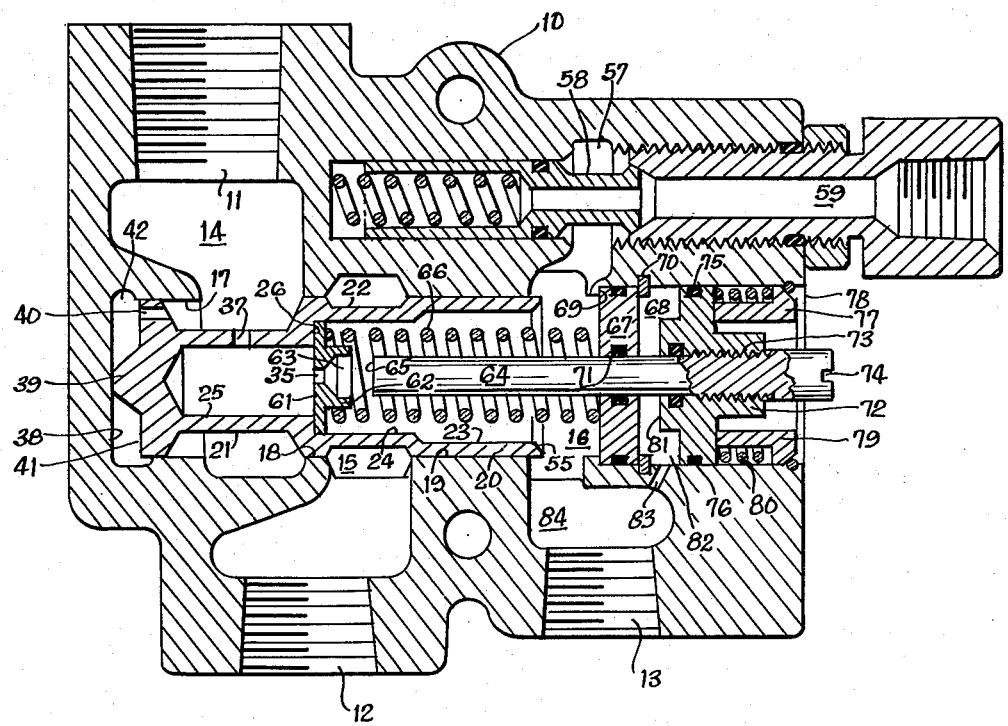
INVENTORS
John D. Allen
BY Ray G. Holt
Charles J. Untied
Atty

United States Patent Office 3,125,110
Patented Mar. 17, 1964

3,125,110
DEMAND TYPE FLOW DIVIDER
John D. Allen, South Euclid, and Ray G. Holt, Westlake, Ohio, assignors to Fawick Corporation, Cleveland, Ohio, a corporation of Michigan
Filed July 10, 1961, Ser. No. 123,035
5 Claims. (Cl. 137—101)

This invention relates to valves of the type known as flow dividers, the function of which is to take the output from a single source of fluid under pressure and divide that output into two streams, each of which may be utilized to operate hydraulic equipment.

It has previously been proposed, for example in O. H. Banker Reissue Patent No. Re. 24,892 for Flow Divider Valve With Relief Valve and Variable Orifice, to provide a flow divider which divides the output of a pump into two streams, one of which is called the controlled flow stream and the other the excess flow stream, the flow through the controlled flow stream being automatically modulated by the valve. The automatically modulating type of flow divider makes it possible to divert a fixed amount of controlled flow for hydraulic equipment, such as power steering on a vehicle, or possibly some other function, when other components of the system connected to the excess flow stream are inoperative, and to reduce the amount of controlled flow when the balance of the system is operated. It has been found desirable in certain installations, however, to divert flow from the excess flow stream to supply fluid for the controlled flow stream only when pressure is increased in the latter. Thus, for example, if a vehicle is equipped with a hydraulically operated lift system and a hydraulically operated power steering mechanism, it may be desirable to divert flow from the lift system to supply fluid for power steering only when hydraulic pressure is built up in the power steering mechanism due to the operation thereof. Such flow divider valve may be called a "demand" type since it applies a greater flow to the controlled flow stream only when the latter demands it.

It is accordingly an object of this invention to provide a flow divider valve which is of the demand type in that in will divert flow from the excess flow stream to the controlled flow stream only when pressure is applied or built up in the latter.

As a more specific object this invention seeks to provide a modification of existing flow divider valves which will adapt them to operation in a manner that will divert flow from the excess flow stream thereof to the controlled flow stream only when pressure is applied to the latter stream.

There is presently available a controlled flow stream modulating type of flow divider, in which a pin modulates the flow through the orifice in the controlled flow stream. The present invention will be described for illustrative purposes as applied to this form, although it may be applied with equal facility to other forms of divider.

The preferred embodiment of this invention from which the foregoing objects and other objects and features of the invention will be apparent is shown in the accompanying drawing in which the sole figure is a cross-section through a flow divider valve of the type in which a pin modulates the flow through an orifice, showing how the present invention may be applied thereto.

Referring now to the drawing for a detailed description of the invention, there is shown a valve body 10 having a threaded inlet opening 11 adapted to be connected through suitable fittings and piping to the outlet of a hydraulic pump adapted to produce a stream of fluid, such as oil or the like, under pressure. Said valve body 10 is also provided with a threaded excess flow opening 12 and a threaded controlled flow opening 13 adapted to be connected through suitable fittings and piping (not shown) to hydraulically operated equipment, such as a lift mechanism and a power steering mechanism, respectively, of a tractor or the like. Within valve body 10 are cored chambers 14, 15 and 16 connected respectively to inlet opening 11, excess flow opening 12, and controlled flow opening 13. The chambers 14, 15 and 16 are sometimes hereinafter referred to as "inlet chamber 14," "excess flow chamber 15," and "controlled flow chamber 16." Said chambers are connected by a valve bore which forms in valve body 10 a valve guide 17, and land 18 and a valve guide 19.

An axially slidable cylindrical valve 20 is disposed in guide 17, land 18 and guide 19 and is formed with a wide peripheral groove 21 at one end and a narrower peripheral groove 22 intermediate the ends thereof, groove 21 being in communication with inlet chamber 14 and groove 22 being in communication with excess flow chamber 15. Land 18 is narrower than guides 17 and 19 so that axial movement of valve 20 will not move said valve off guides 17 and 19, but will move groove 21 into communication with excess flow chamber 15 as well as with inlet chamber 14 whereby to establish flow from inlet chamber 14 to excess flow chamber 15.

Valve 20 is formed with a recess extending axially inwardly from the right hand side thereof, as viewed in the drawing, said recess being comprised of a bore 23 and successively smaller counter-bores 24 and 25, the latter two forming between them a shoulder 26. A disc-shaped orifice plate 61 is fitted into counter-bore 24 and is held against shoulder 26 by a spring 66, the right-hand end of which as viewed in the drawing abuts against a disc 67 fixed in a bore 68 by a shoulder 69 at one side and by a snap ring 70 on the other side. Orifice plate 61 is formed with a short centrally located stem 62 around which the left-hand end of spring 66, as viewed in the drawing, is disposed and by which it is centered with respect to said plate 61. An orifice 35 is formed in plate 61, said orifice communicating with an enlarged bore 63 in stem 62 and thence with counter-bore 24 and bore 23 in valve 20.

A cross-bore 37 in valve 20 connects counter-bore 25 with the bottom of groove 21 and establishes communication between the interior of the valve and inlet chamber 14.

Movement of valve 20 to the left, as viewed in FIG. 1, under the influence of spring 66 is limited by wall 38 in valve body 10 against which the conical tip 39 of valve 20 is adapted to bear. A small axially extending bore 40 connects groove 21 with the end 41 of valve 20 which is held spaced from wall 38 by tip 39 so as to form therewith a chamber 42 into which fluid under pressure from chamber 14 may flow. In the form chosen to illustrate this invention, guides 17 and 19 and land 18 are of the same diameter so that the valve is balanced insofar as the pressures in chambers 14 and 15 are concerned, but the admission of fluid under pressure into chamber 42 through bore 40 from inlet chamber 14 produces an axial thrust or pressure upon valve 20 toward the right, as viewed in the drawing, in opposition to the pressure of spring 66. However, because of the presence of orifice 35, fluid under pressure will flow into recess 23 and chamber 84 so that a pressure will be established in the control flow which will be less than the pressure in chamber 14 by the pressure drop across orifice 35, and hence spring 66 will be opposing only the pressure drop across orifice 35.

The opening 63 is of sufficient diameter to accommodate a coaxially disposed pin 64, the left-hand end 65 of which as viewed in the drawing is adapted to cooperate with orifice 35 to modulate the flow therethrough. Pin 64 extends through a sealed opening 71 in disc 67 and through a piston 72 slidable in bore 68. The right-hand end 73 of pin 64 is threaded with respect to piston 72 and terminates in a head having a screw driver slot 74 by which said screw 64 may be turned in piston 72. It is contemplated that said piston will be sealed with respect to bore 68 by an O-ring 75 which is compressed in a suitable groove 76 in the exterior surface of piston 72 against bore 68 and will thereby provide sufficient resistance to turning of the piston in bore 68 to enable pin 64 to be adjusted with reference to said piston 72.

A sleeve type abutment 77 is inserted in bore 68 and held against outward movement with respect thereto with a snap ring 78. Said abutment has a reduced diameter section 79 around which is disposed a spring 80 compressed between abutment 79 and piston 72.

Piston 72 is formed at its left-hand end, as viewed in the drawing, with a short extension 81 so that when piston 72 is urged to the left by spring 80 against disc 67, an annular chamber 82 will be formed. A small passageway 83 is drilled in housing 60 connecting a chamber 84 in communication with controlled flow opening 13 directly with chamber 82. Said chamber 84 is in turn in direct communication at all times around the end 55 of valve 20 with the interior of said valve and with orifice 35.

In the operation of the form of valve illustrated in the drawing, piston 72 will normally be held against disc 67 and will thereby hold the end 65 of pin 64 in proximity to orifice 35 so that fluid passing therethrough from chamber 25 and cross-bore 37 will be modulated in its flow as valve 20 is pushed to the right by the pressure drop across orifice 35. Thus when the demand in the system connected to controlled flow opening 13 is low, valve 20 will operate with pin 64 as a noraml self-adjusting flow dividing valve. If, however, the demand in the system connected to controlled flow opening 13 should increase so that the pressure thereof increases likewise, said pressure will be communicated from chamber 84 through passageway 83 into chamber 82 and will exert a pressure upon piston 72 toward the right, as viewed in the drawing, against the action of spring 80. When the fluid pressure in chamber 82 exceeds the pressure of spring 80, said piston 72 will move to the right and carry with it pin 64, thereby increasing the spacing between end 65 thereof and orifice 35 to increase the flow therethrough. Piston 72 will remain in the position shown in the drawing as long as sufficient fluid pressure is present in the controlled flow system including chambers 84 and 82 and the interconnecting passageway 83 to operate piston 72. When the demand in the controlled flow system decreases sufficiently, spring 80 will again move piston 72 and its pin 64 to the left until piston 72 abuts upon disc 67, and valve 20 then modulates the flow of the controlled flow stream through orifice 35 and in conjunction with the proximate face 65 of pin 64.

Excessive pressures in chamber 84 are relieved through a chamber 57 in communication with chamber 84 and through an unbalanced relief valve 58 in said chamber 57.

Thus means are provided for preventing a cessation of flow in the controlled flow system and, in fact, for overcoming the modulating operation of the valve and for producing a definite and increased flow through the controlled flow system when demanded. In a typical embodiment on a vehicle, a valve similar in operation to the one disclosed herein was connected to a pump which delivered 15 gallons per minute, and the controlled flow port 13 was connected to an open center type hydraulic steering system for the vehicle. The excess flow port 12 was connected to a lift system disposed on the vehicle. When the lift system was not pressurized, that is, when it was not in use, the flow to the steering system was 2½ gallons per minute and that to the lift system was 7½ galolns per minute. When the lift sysetem was pressurized, but the steering system was not in use, the flow to the steering system was reduced to 1 gallon per minute while that to the lift system was increased to 14 gallons per minute. When both the steering system and the lift system were pressurized, the flow to the steering system increased to 2½ gallons per minute and that to the lift system was reduced to 12½ gallons per minute.

Thus it may be apparent that we have provided a flow divider valve which may function in the identical manner as a self-adjusting flow divider valve of the type shown in the aforementioned reissued Patent No. 24,892 when the demand in the controlled flow system is low or nonexistent, but which upon an increase in the demand for fluid under pressure in the controlled flow system, will change its operation so that it will provide the necessary volume of flow.

The foregoing description is merely illustrative of preferred embodiments of this invention and it is understood therefore that the scope of the invention is not limited thereby but is to be determined by the appended claims.

We claim:

1. A flow divider valve comprising a valve body having inlet, excess flow and controlled flow chambers connected respectively to inlet, excess flow and controlled flow openings thereinto, a valve having an orifice therethrough connecting the inlet and controlled flow chambers and responsive to the pressure drop across said orifice for controlling flow from the inlet chamber to the excess flow chamber, a cylinder defined by the valve body, a piston in said cylinder, an axial extension carried by and movable with said piston, said extension being disposed in confronting relationship to said orifice and cooperating therewith to define a passage for said controlled flow, means normally urging said piston and extension toward said orifice to restrict said passage for controlled flow and stop means on the valve body limiting movement of the piston toward said orifice, said cylinder being subjected to the pressure of the fluid in the controlled flow chamber on the side of the piston to oppose the means normally urging said piston and extension toward said orifice, whereby to enlarge said passage for controlled flow and increase the quantity of fluid flowing to the controlled flow chamber in accordance with the pressure existing in said controlled flow chamber.

2. A flow divider valve comprising a valve body having inlet, excess flow and controlled flow chambers connected respectively to inlet, excess flow and controlled flow openings thereinto, a valve bore in the valve body connecting all of said chambers, a valve in said bore adapted in one position to prevent communication between the inlet and excess flow chambers, said valve having a passage therethrough including an orifice continuously connecting the inlet and controlled flow chambers, a second bore in the valve body concentric with the valve bore, a piston slidable in said second bore, a pin threadedly received in said piston to move therewith, said pin extending in confronting relationship to said orifice to control the flow therethrough, an abutment in said second bore, axially fixed means interposed between the piston and valve in said second bore and sealed with respect to said second bore and said pin to form with said piston and second bore a fluid chamber, said valve body having a passage connecting the controlled flow chamber with the interior of the fluid chamber, and resilient means acting against said abutment and normally urging the piston and pin toward said orifice.

3. A flow divider as described in claim 2, and resilient means compressed between said axially fixed means and the valve for urging said valve to its said one position.

4. A flow divider as described in claim 2, said pin extending through said piston to the exterior thereof and being accessible from the exterior of the valve body for effecting adjustment thereof relative to said piston.

5. A flow divider valve comprising a valve body having inlet, excess flow and controlled flow chambers connected respectively to inlet, excess flow and controlled flow openings thereinto, valve means in the valve body between said inlet chamber and said excess flow and controlled flow chambers, said valve means being responsive to the pressure of the fluid in the inlet chamber for controlling flow from the inlet chamber to the excess flow and controlled flow chambers, and means in the valve body normally positioned in confronting relationship to an orifice portion of said valve means and cooperating therewith to modulate the flow from the inlet chamber to the controlled flow chamber, said means being movable, in response to a sufficiently high pressure in the controlled flow chamber, away from said portion of said valve means to increase the flow from the inlet chamber to the controlled flow chamber.

References Cited in the file of this patent
UNITED STATES PATENTS

| | | |
|---|---|---|
| Re. 24,892 | Banker | Oct. 25, 1960 |
| 2,846,850 | Hall | Aug. 12, 1958 |
| 2,995,141 | Hipp | Aug. 8, 161 |